United States Patent
Kim et al.

(10) Patent No.: US 8,504,219 B2
(45) Date of Patent: Aug. 6, 2013

(54) TELEMATICS DEVICE FOR ELECTRIC VEHICLE AND REMOTE AIR-CONDITIONING CONTROL METHOD THEREOF

(75) Inventors: Myung Hoe Kim, Seoul (KR); Woo Sung Kim, Gyeonggi-Do (KR); Do Sung Hwang, Gyeonggi-Do (KR); Hyung Jin Yoon, Gyeonggi-Do (KR); Sung Yun Kim, Jeju-Do (KR); Woo Suk Sung, Gyeonggi-Do (KR); Ji-Hwon Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 332 days.

(21) Appl. No.: 12/950,038

(22) Filed: Nov. 19, 2010

(65) Prior Publication Data
US 2012/0101659 A1    Apr. 26, 2012

(30) Foreign Application Priority Data
Oct. 20, 2010    (KR) .................... 10-2010-0102651

(51) Int. Cl.
*G05D 1/00*    (2006.01)
(52) U.S. Cl.
USPC ................. 701/2; 701/22; 320/134; 903/903; 702/63

(58) Field of Classification Search
USPC ........ 701/2, 22, 29.1; 320/109, 134; 903/903; 702/63
See application file for complete search history.

(56) References Cited

U.S. PATENT DOCUMENTS

| | | | |
|---|---|---|---|
| 2009/0027012 A1* | 1/2009 | Umetsu et al. ................ | 320/148 |
| 2010/0013436 A1 | 1/2010 | Lowenthal et al. | |
| 2010/0076825 A1 | 3/2010 | Sato et al. | |
| 2012/0105009 A1* | 5/2012 | Yao ................................ | 320/134 |

FOREIGN PATENT DOCUMENTS

| | | |
|---|---|---|
| JP | 08-065814 A | 3/1996 |
| JP | 2007-094867 A | 4/2007 |
| KR | 102010051905 A | 5/2010 |

OTHER PUBLICATIONS

WIFI thermostat control: author unknown; www.smarthome.com/wifi-thermostat.html; copyright 1995.*

* cited by examiner

*Primary Examiner* — Gertrude Arthur Jeanglaude
(74) *Attorney, Agent, or Firm* — Edwards Wildman Palmer LLP; Peter F. Corless

(57) ABSTRACT

A telematics device for an electric vehicle and a remote air-conditioning control method thereof are provided. A vehicle driver remote adjusts an indoor temperature of the electric vehicle by driving an air-conditioning unit of the vehicle during the battery charging, so that a travelable distance based on the battery life can be maximized.

11 Claims, 4 Drawing Sheets

TELEMATICS DEVICE FOR ELECTRIC VEHICLE AND REMOTE AIR-CONDITIONING CONTROL METHOD THEREOF

CROSS-REFERENCE TO RELATED APPLICATION

This application claims under 35 U.S.C. §119(a) the benefit of Korean patent application No. 10-2010-0102651 filed on Oct. 20, 2010, the disclosure of which is hereby incorporated in its entirety by reference.

BACKGROUND OF THE INVENTION

Embodiments of the present invention relate to an electric vehicle, and more particularly to a telematics device for an electric vehicle to adjust an indoor temperature by driving an air-conditioning unit using a charging current at a remote site during the charging time of a battery of the electric vehicle, and a remote air-conditioning control method thereof.

Recently, an electric vehicle using electricity has been developed and marketed. Such an electric vehicle is driven using electricity stored in a battery mounted therein. The electric vehicle is advantageous in that noise is minimized and exhaust gases are not discharged, thereby protecting the environment.

It is important to increase the lifespan of a battery in development and commercialization of such an electrical vehicle. The methods for increasing the lifespan of a battery have been proposed, but are not satisfactory, however.

The above information disclosed in this Background section is only for enhancement of understanding of the background of the invention and therefore it may contain information that does not form the prior art that is already known in this country to a person of ordinary skill in the art.

BRIEF SUMMARY OF THE INVENTION

Various embodiments of the present invention are directed to providing a telematics device for an electric vehicle and a remote air-conditioning control method thereof that substantially obviate one or more problems due to limitations and disadvantages of the related art.

It is an object of the present invention to provide a telematics device for adjusting an indoor temperature of an electric vehicle using a charging current at a remote site during the battery charging time.

In accordance with an aspect of the present invention, a telematics device for an electric vehicle includes a temperature adjusting unit for adjusting an indoor temperature by driving an air-conditioning unit of the electric vehicle; a battery charging unit for controlling battery charging, and adjusting a power-supply amount for the temperature adjusting unit according to battery State of Charge (SOC) information and a charging current amount when receiving a power-supply signal for the temperature adjusting unit during a battery charging time; and a controller for outputting the power-supply signal upon receiving a remote control signal from a predetermined server, and adjusting an indoor temperature of the electric vehicle by controlling the temperature adjusting unit.

The telematics device may further include a temperature sensing unit for measuring indoor temperature of the vehicle and outputting the measured temperature information to the controller.

The controller may transmit the battery SOC information and the temperature information to the server during the battery charging time.

The battery charging unit may adjust a ratio of a current amount required for the battery charging to another current amount applied to the temperature adjusting unit according to the battery SOC information and the charging current amount.

The battery charging unit, if the battery is completely charged, may provide the entirety of the charging current to the temperature adjusting unit.

The battery charging unit may calculate a battery SOC and an estimated full-charging time using the charging current amount, and transmit the calculated result to the controller.

The controller may periodically transmit charging information including not only battery SOC but also the estimated full-charging time to the server.

The battery charging unit may transmit a charging start signal to the controller when battery charging begins to operate, and transmit a charging end signal to the controller when the battery charging is finished.

The controller may control the temperature adjusting unit at a reserved time according to predetermined reservation information.

In accordance with another aspect of the present invention, a remote air-conditioning control method for an electric vehicle includes acquiring temperature information and battery State of Charge (SOC) information of the electric vehicle during a battery charging time, and transmitting the acquired information to a predetermined server; and adjusting an indoor temperature by driving an air-conditioning unit of the electric vehicle upon receiving a remote control signal from the server.

The battery charging information may include battery State of Charge (SOC) information and information about an estimated full-charging time.

Upon receiving the remote control signal during the battery charging, the adjusting step may drive the air-conditioning unit using some parts of a charging current.

The ratio of a current amount required for battery charging to another current amount for driving the air-conditioning unit may be adjusted according to a battery State of Charge (SOC) and a charging current amount.

DESCRIPTION OF EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
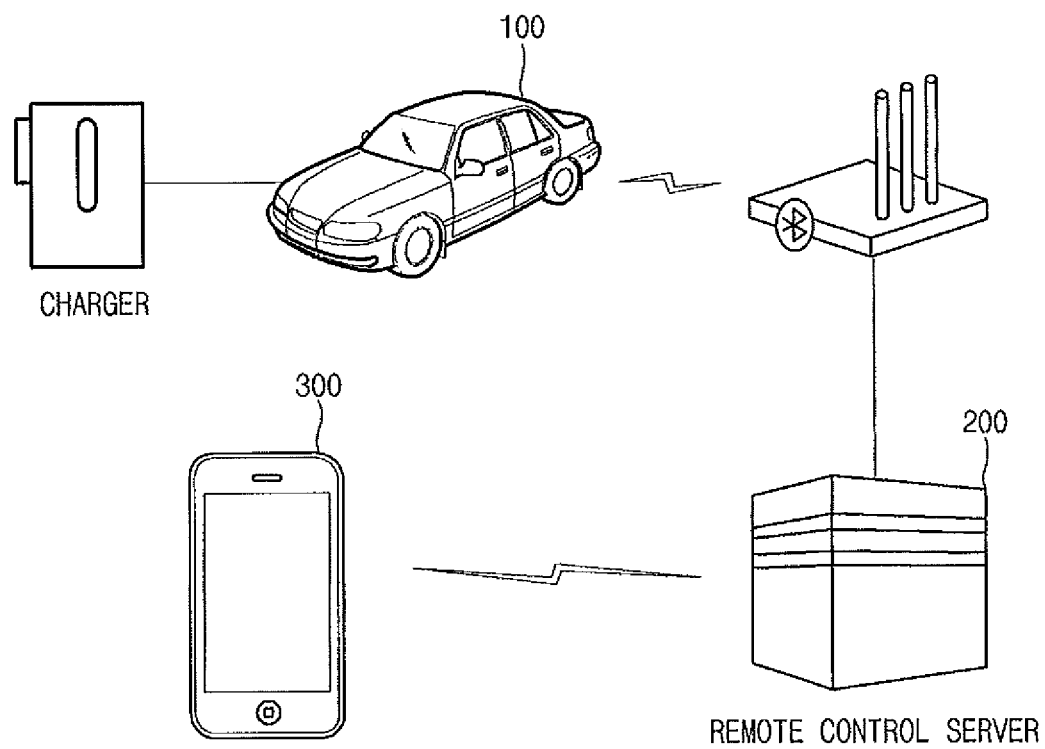
FIG. 1 is a diagram showing the overall configuration of a remote air-conditioning control system of an electric vehicle of an embodiment of the present invention.

FIG. 1 is a diagram showing the overall configuration of a remote air-conditioning control system of an electric vehicle of an embodiment of the present invention.

Referring to FIG. 1, the system includes a telematics device 100, a remote control server 200, and a remote control terminal 300.

The telematics device 100 is mounted in an electric vehicle so as to perform wireless communication with the remote control server 200 through a wireless repeater (e.g., Access Point (AP)) mounted in a charging station or a mobile communication network when the electric vehicle enters the charging station. The telematics device 100 transmits a charging start signal and a charging end signal to the control server 200 when the charging of a battery is started or finished. While the battery is charged, the telematices device 100 transmits battery charging information (including a State of Charge (SOC) of the battery, and a charging completion time), information about indoor/outdoor temperatures of a vehicle to the remote control server 200 over a wireless communication network. The telematics device 100 controls the air-conditioning unit according to a remote control signal received from the remote control server 200 or predetermined reservation information, so that it adjusts an indoor temperature of the vehicle. Specifically, the telematics device 100 according to the present invention drives the air-conditioning unit using some parts of the charging current according to a battery SOC and a charging current amount, when a remote control signal for adjusting a vehicle temperature is received or temperature adjustment is reserved before the battery is fully charged (i.e., during the battery charging).

The remote control server 200 stores and manages information about the electric vehicle and the driver. Upon receiving battery charging information of the electric vehicle and temperature information from the telematics device 100, the remote control server 200 transmits the received information to the remote control terminal 300 registered in correspondence with the electric vehicle over a wired/wireless communication network. That is, the remote control server 200 allows the driver to recognize the battery SOC and the indoor/outdoor temperatures of the vehicle using the remote control terminal 300 in real time. The remote control server 200 receives a remote control signal from the remote control terminal 300 and transmits the remote control signal to the telematics device 100 of the electric vehicle corresponding to the remote control terminal 300. That is, the remote control server 200 may enable a vehicle driver to remotely control the air-conditioning unit of the electric vehicle using the remote control terminal 300

The remote terminal 300 is a driver's terminal (i.e., a service scriber's terminal) which accesses the remote control server 200 by executing an application interlocked with the control server 200 so as to enable the driver to monitor battery charging information and indoor/outdoor temperatures of the vehicle. The remote control terminal 300 generates a remote control signal according to key manipulation of the driver and transmits the remote control signal to the remote control server 200. The remote control terminal 300 may include all terminals (e.g., a PC, a smart phone, a PDA, a PMP, etc.) which can access the remote control server 200 over a wired/wireless communication network (WEB, WIBRO, WIFI, RF Communication, etc.)

Figure 2:
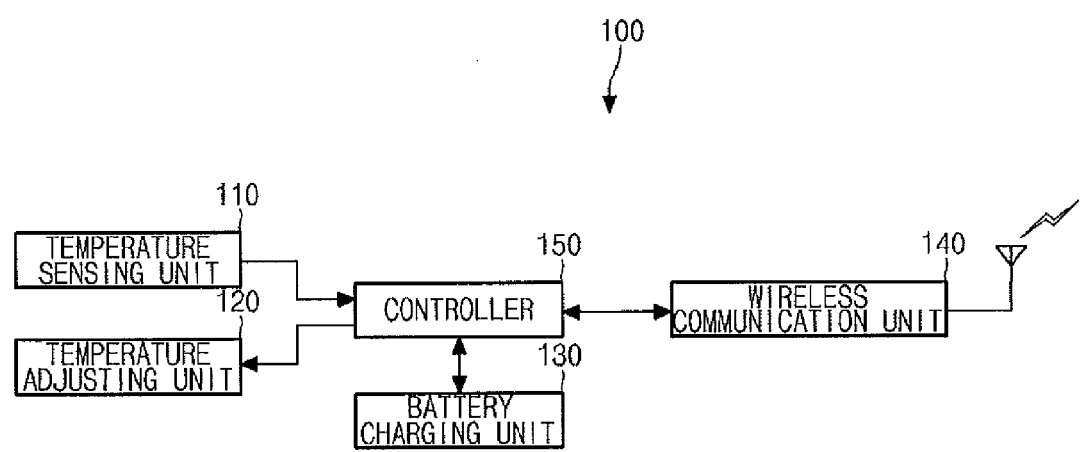
FIG. 2 is a diagram showing the configuration of a telematics device mounted in the vehicle shown in FIG. 1.

FIG. 2 is a diagram showing the configuration of a telematics device mounted in the vehicle shown in FIG. 1.

The telematics device 100 may include a temperature sensing unit 110, a temperature adjusting unit 120, a battery charging unit 130, a wireless communication unit 140, and a controller 150.

The temperature sensing unit 110 measures indoor/outdoor temperatures of the electric vehicle, and transmits the measured temperature information to the controller 150.

The temperature adjusting unit 120 operates an air-conditioning unit (air-conditioner or heater) installed in the electric vehicle under the control of the controller 150 so that it adjusts an indoor temperature of the vehicle.

The battery charging unit 130 manages overall states of the battery charging function. The battery charging unit 130 measures a charged current amount during the battery charging, calculates a battery SOC (State of Charge) and an estimated full-charging time by measuring the charging current amount, and transmits the calculated result to the controller 150. Specifically, upon receiving a power-supply signal for the temperature adjusting unit 120 from the controller 150 during the battery charging, the battery charging unit 130 provides some of the charging current to the temperature adjusting unit 120 according to the battery SOC and the charging current amount. That is, if the battery charging unit 130 receives a power-supply signal while battery charging occurs, the entirety of the charging current is not used for the battery charging, and some of the charging current is adapted to drive the air-conditioning unit. In this case, the ratio of the current amount used for the battery charging to the other current amount used for driving the air-conditioning unit is changed in response to the battery SOC and the charging current amount. Upon completion of the battery charging, the battery charging unit 130 transmits a charging end signal to the controller 150, and is turned off. In addition, if the battery is fully charged on the condition that a charging plug of the battery charging unit 130 is connected to a vehicle, the battery charging unit 130 is turned off. Thereafter; if the battery charging unit 130 receives a power-supply signal for the temperature adjusting unit 120 from the controller 150, the battery charging unit 130 is woken up again so that it provides a current received from the charging unit to the temperature adjusting unit 120.

The wireless communication unit 140 transmits and receives data to and from the remote control server 200 over a wireless communication network according to a predefined communication protocol. The wireless communication unit 140 may transmit and receive data using a wireless communication technology such as a mobile communication technology (CDMA, WCDMA, etc.), a wireless Internet (WIBRO, WIFI, etc,) technology, a Local Area Network (LAN) communication technology (Bluetooth, RFID, IrDA, ZigBee, etc.).

The controller 150 controls overall operations of the telematics device 100, and transmits the battery SOC information received from the battery charging unit 130 and the temperature information received from the temperature sensing unit 110 to the remote control server 200 through the wireless communication unit 140. The controller 150 outputs a power-supply signal to the battery charging unit 130 according to the remote control signal received from the remote control server 200 or the pre-stored reservation information, and drives the air-conditioning unit (air-conditioning or heater) of the vehicle by controlling the temperature adjusting unit 120.

Figure 3:
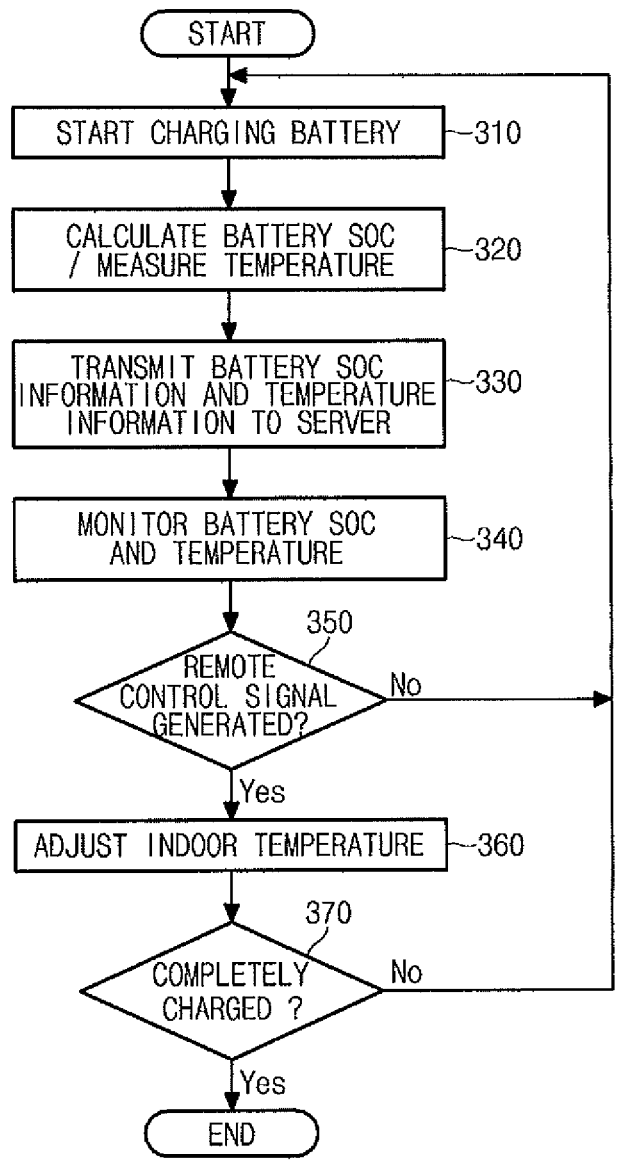
FIG. 3 is a flowchart illustrating a method of providing a remote air-conditioning control service using the telematics device of FIG. 2.

FIG. 3 is a flowchart illustrating a method of providing a remote air-conditioning control service using the telematics device of FIG. 2.

When the electric vehicle enters a charging station, the telematics device 100 mounted in the electric vehicle performs communication with the control server 200 over the wireless communication network according to a predefined communication protocol.

In a wireless communication method, communication with the control server 200 is performed through, e.g., an AP or a mobile communication (CDMA, WCDMA, or WIBRO) repeater (base station).

Generally, the charging time of 6~8 hours or more is needed for charging the electric vehicle at low speed, so that the vehicle driver may move from a current place to another place (e.g., home or office) instead of staying in the charging station during the low-speed charging mode.

If the charging plug located in the charging station is connected to the vehicle, the battery charging unit 130 transmits a charging start signal to the controller 150 and begins to charge the battery with electricity (Step 310).

The controller 150 having received the charging start signal transmits a signal indicating the beginning of the battery charging to the remote control server 200 through the wireless communication unit 140. Therefore, the remote control server 200 may transmit a signal indicating the beginning of the battery charging to the remote control terminal 300 corresponding to the corresponding electric vehicle.

During the battery charging, the battery charging unit 130 measures the charging current amount of the battery to calculate the battery SOC and the estimated full charging time, and transmits the calculated resultant values to the controller 150. In addition, the controller 150 drives the temperature sensing unit 100, so that it measures indoor/outdoor temperatures of the vehicle during the battery charging mode and receives the measured temperature information (Step 320).

The controller 150 periodically (e.g., every 20 seconds) transmits the battery SOC information received from the battery charging unit 130 and the temperature information received from the temperature sensing unit 110 to the remote control server 200 (Step 330).

If the vehicle driver located at a remote site selects the corresponding menu of the remote control terminal 300 so as to recognize a vehicle state, the remote control terminal (e.g., a smart phone) 300 drives an application interlocking with the remote control server 200 so that it accesses the remote control server 200. If the driver accesses the remote control server 200 to monitor the telematics terminal 100 before the telematics device 100 does not access the remote control server 200, the remote control server 200 may transmit a connection denial message to the remote control terminal 300.

Figure 4:
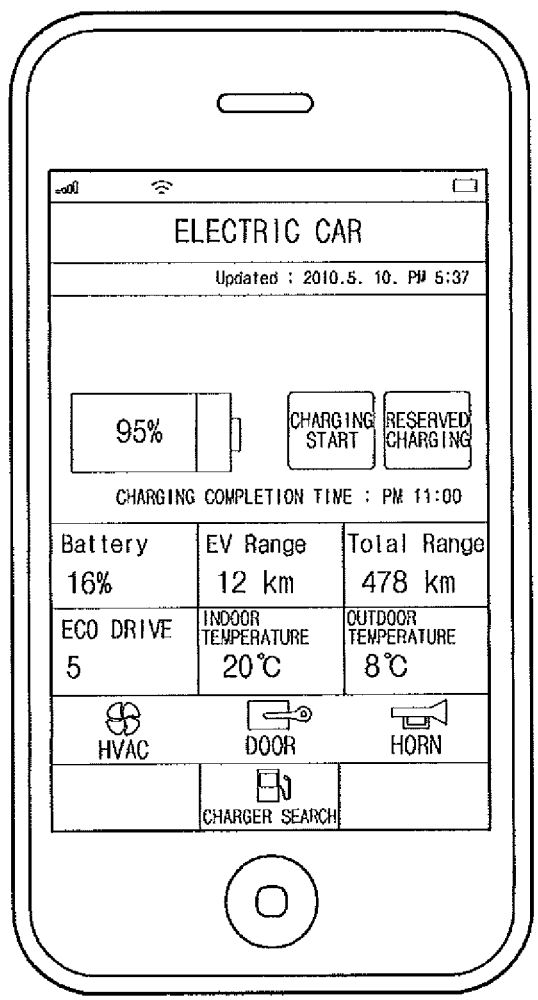
FIG. 4 is a diagram showing a remote control terminal (smart phone), on which charging information and temperature information are displayed, according to an embodiment of the present invention.

If the telematics device 100 and the remote control terminal 300 are normally connected to the remote control server 200, the remote control server 200 transmits vehicle information (battery SOC, full-charging time, indoor/outdoor temperatures of the vehicle) received from the telematics device 100 to the remote control terminal 300. Upon receiving vehicle information through the wireless communication unit 140, the controller 150 displays the vehicle information on the screen as shown in FIG. 4, so that the vehicle driver can monitor the corresponding information (Step 340).

Thereafter, if the driver sets a temperature using an air-conditioning control menu of the remote control terminal 300, a remote control signal for temperature control is transmitted to the telematics device 100 through the remote control server 200 (Step 350).

For example, if a current indoor temperature of the vehicle is low when the driver desires to re-drive the vehicle, and the driver sets a vehicle temperature to a desired temperature (e.g., 23° C.) using the air-conditioning control menu of the remote control terminal 300, the corresponding remote control signal is transmitted to the controller 150 through the remote control server 200.

The controller 150 having received the remote control signal outputs a power-supply signal to the battery charging unit 130 so that the temperature adjusting unit 120 is powered on. In addition, the controller 150 controls the temperature adjusting unit 120 to adjust the indoor temperature of the vehicle (Step 360).

In this case, the battery charging unit 130 having received the power-supply signal adjusts the power of the temperature adjusting unit 120 in response to the battery SOC state and the charging current amount.

For example, if a battery is completely charged with electricity, the battery charging unit 130 provides the entirety of the charging currents received through the charging plug to the temperature adjusting unit 120. However, if the battery is not completely charged yet, some of the charging current is transmitted to the temperature adjusting unit 120. In this case, the ratio of a current amount applied to the temperature adjusting unit 120 from among the entirety of the charging current amount may be changed according to the battery SOC state. For example, as the battery charging ratio is increased, the current amount for battery charging is gradually decreased, and the other current amount applied to the temperature adjusting unit 120 is gradually increased.

If temperature adjustment begins to operate, the controller 150 transmits a signal for indicating the beginning of temperature adjustment to the remote control terminal 300 through the remote control server 200.

The controller 150 drives the temperature adjusting unit 120 until the indoor temperature measured by the temperature sensing unit 110 reaches a user-set temperature, and periodically transmits the corresponding temperature information to the remote control server 200, so that the driver can monitor variation in temperature.

If the indoor temperature reaches a target temperature set by the driver or if the controller 150 receives a remote control signal requesting temperature adjustment interruption from the remote control server 200, the controller 150 stops operations of the temperature adjusting unit 120, and outputs a power-supply interruption signal for the temperature adjusting unit 120 to the battery charging unit 130. In this case, the battery charging unit 130 may re-use the entirety of the charging current to charge the battery with electricity.

If the indoor temperature adjustment and the battery charging are completed, the battery charging unit 130 transmits the charging end signal to the controller 160 so that it is automatically turned off. The controller 150 transmits a signal indicating battery charging completion to the remote control server 200 through the wireless communication unit 140. The remote control server 200 transmits the signal for indicating the battery charging completion to the remote control terminal 300 (Step 370).

As described above, the telematics device according to the present invention can allow the driver to remotely monitor battery charging information and indoor/outdoor temperature information when the vehicle is now being charged, and can adjust an indoor temperature of the vehicle using the charging current of the charging station, so that it allows the vehicle to reach an optimum temperature without consuming the battery power.

Therefore, the telematics device according to the present invention can reduce the number of driving the air-conditioning unit while the vehicle is traveling, and reduce consumption of battery power required for driving the air-conditioning unit, resulting in a guarantee of a longer travelable distance.

Although it is described in the above-mentioned embodiments that a smart phone can be used as a terminal, the other terminals such as a Personal Computer (PC) still can be used, and then the remote monitoring and control can be used through a web-page received from the remote control server 200. In addition, although it is described in the above-mentioned embodiments that the driver can monitor the vehicle charging state and perform the remote control function, the controller 150 still can perform by, e.g., controlling the temperature adjusting unit 120 at a reserved time on the condition that the driver reserves an indoor temperature adjusting time and an indoor temperature.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

What is claimed is:

1. A telematics device for an electric vehicle comprising:
    a temperature adjusting unit for adjusting an indoor temperature by driving an air-conditioning unit of the electric vehicle;
    a battery charging unit for controlling battery charging, and adjusting a current amount applied to the temperature adjusting unit according to battery State of Charge (SOC) information and a charging current amount when receiving a power-supply signal for the temperature adjusting unit during a battery charging time; and
    a controller for outputting the power-supply signal upon receiving a remote control signal from a predetermined server, and adjusting an indoor temperature of the electric vehicle by controlling the temperature adjusting unit,
    wherein the battery charging unit adjusts a ratio of a current amount required for the battery charging to another current amount applied to the themperature adjusting unit according to the battery SOC information and the charging current amount.

2. The telematics device according to claim 1, further comprising:
    a temperature sensing unit for measuring indoor temperature of the vehicle and outputting the measured temperature information to the controller.

3. The telematics device according to claim 1, wherein the controller transmits the battery SOC information and the temperature information to the server during the battery charging time.

4. The telematics device according to claim 1, wherein the battery charging unit, if the battery is completely charged, provides the entirety of the charging current to the temperature adjusting unit.

5. The telematics device according to claim 1, wherein the battery charging unit calculates a battery SOC and an estimated full-charging time using the charging current amount, and transmits the calculated result to the controller.

6. The telematics device according to claim 4, wherein the controller periodically transmits charging information including not only battery SOC but also the estimated full-charging time to the server.

7. The telematics device according to claim 1, wherein the battery charging unit transmits a charging start signal to the controller when battery charging begins to operate, and transmits a charging end signal to the controller when the battery charging is finished.

8. The telematics device according to claim 1, wherein the controller controls the temperature adjusting unit at a reserved time according to predetermined reservation information.

9. A remote air-conditioning control method for an electric vehicle comprising:
    acquiring temperature information and battery State of Charge (SOC) information of the electric vehicle during a battery charging time, and transmitting the acquired information to a predetermined server; and
    adjusting an indoor temperature by driving an air-conditioning unit of the electric vehicle upon receiving a remote control signal from the server,
    wherein a ratio of a current amount required for battery charging to another current amount for driving the air-conditioning unit is adjusted according to a battery SOC and a charging current amount.

10. The method according to claim 9, wherein the battery charging information includes battery State of Charge (SOC) information and information about an estimated full-charging time.

11. The method according to claim 9, wherein the adjusting step upon receiving the remote control signal during the battery charging comprises driving the air-conditioning unit using some parts of the charging current.

* * * * *